United States Patent
Guo et al.

(10) Patent No.: US 12,331,183 B2
(45) Date of Patent: Jun. 17, 2025

(54) ANTENNA HOUSING WITH IMPROVED FALLING WEIGHT IMPACT RESISTANCE

(71) Applicant: SABIC GLOBAL TECHNOLOGIES B.V., Bergen op Zoom (NL)

(72) Inventors: Jing Guo, Geleen (NL); Chaodong Jiang, Geleen (NL); Christelle Marie Hélène Grein, Geleen (NL)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 755 days.

(21) Appl. No.: 17/424,034

(22) PCT Filed: Jan. 21, 2020

(86) PCT No.: PCT/EP2020/051447
§ 371 (c)(1),
(2) Date: Jul. 19, 2021

(87) PCT Pub. No.: WO2020/152187
PCT Pub. Date: Jul. 30, 2020

(65) Prior Publication Data
US 2022/0098394 A1 Mar. 31, 2022

(30) Foreign Application Priority Data
Jan. 24, 2019 (CN) .......................... 201910066643.9

(51) Int. Cl.
*C08L 23/14* (2006.01)
*C08L 23/12* (2006.01)

(52) U.S. Cl.
CPC .............. *C08L 23/14* (2013.01); *C08L 23/12* (2013.01); *C08L 2205/025* (2013.01); *C08L 2205/03* (2013.01); *C08L 2207/02* (2013.01); *C08L 2207/04* (2013.01)

(58) Field of Classification Search
CPC .... C08L 23/14; C08L 23/12; C08L 2205/025; C08L 2205/03; C08L 2207/02; C08L 2207/04; H01Q 1/40; H01Q 1/42
See application file for complete search history.

(56) References Cited

U.S. PATENT DOCUMENTS

| | | | |
|---|---|---|---|
| 5,017,714 A | 5/1991 | Welborn, Jr. | |
| 5,081,170 A | 1/1992 | Yagi et al. | |
| 5,124,456 A | 6/1992 | Carette et al. | |
| 5,324,820 A | 6/1994 | Baxter | |
| 7,291,669 B2 | 11/2007 | Botkin et al. | |
| 7,608,531 B2 * | 10/2009 | Isa | H01L 27/1292 438/584 |
| 8,926,862 B2 * | 1/2015 | Kim | C08L 67/02 524/286 |
| 2010/0286310 A1 | 11/2010 | Lederer et al. | |
| 2011/0076905 A1 | 3/2011 | Mussig et al. | |
| 2015/0315465 A1 | 11/2015 | Gupta et al. | |
| 2017/0088689 A1 | 3/2017 | Van Mierloo et al. | |
| 2022/0073717 A1 | 3/2022 | Guo et al. | |

FOREIGN PATENT DOCUMENTS

| | | | | |
|---|---|---|---|---|
| CN | 1580115 A | * | 2/2005 | |
| CN | 102336969 A | * | 2/2012 | |
| CN | 106633784 A | * | 5/2017 | ............. C08L 71/12 |
| CN | 107312242 A | * | 11/2017 | ............. C08L 23/12 |
| CN | 108467532 A | | 8/2018 | |
| CN | 109777025 A | * | 5/2019 | |
| EP | 1088871 A1 | | 4/2001 | |
| JP | 2001284959 A | * | 10/2001 | |
| KR | 101339092 B1 | * | 12/2013 | |
| KR | 101339092 B2 | | 12/2013 | |
| WO | 2020152187 A1 | | 7/2020 | |

OTHER PUBLICATIONS

Yamaoka, JP2001284959-MT (Year: 2001).*
International Search Report for International Application No. PCT/EP2020/051447; Application Filing Date: Jan. 21, 2020; Date of Mailing: Apr. 7, 2020; 3 pages.
Written Opinion for International Application No. PCT/EP2020/051447; Application Filing Date: Jan. 21, 2020; Date of Mailing: Apr. 7, 2020; 6 pages.
Allen et al., "Interactions of antioxidants with hindered piperidine compounds in the thermal and photochemical oxidation of polypropylene fime." Plastics and Rubber Processing and Applications;1985;5:259-265.
Kikkawa et al., "Antagonism Between Hindered Amine Light Stabilizers and Sulfur-containing Compounds" Polymer Degraduation and Stability; 1987; 18:237-245.
Kikkawa, "New Development in Polymer Photostabilization" Polymer Degraduation and Stability; 1995;49:135-143.
Kisuma Chemicals data sheet for DHT-4A. Retrieved from www.advanced-polymer.com. Archived on Internet Archive on Oct. 30, 2013. (Year: 2013).
Malatesta et al., "High Heat and UV-Stabilization of Polyolefins under demanding conditions." Addcon World, the 11th International Plastics Additives and Modifiers Conference, Hamburg;2005.

* cited by examiner

*Primary Examiner* — Peter F Godenschwager
*Assistant Examiner* — Zhen Liu
(74) *Attorney, Agent, or Firm* — CANTOR COLBURN LLP

(57) ABSTRACT

The present invention relates to an antenna housing comprising a polymer composition, wherein the polymer composition comprises a thermoplastic polymer, glass fiber and an inorganic filler. The present invention also relates to a process for the preparation of an antenna housing and the use of a polymer composition for the preparation of an antenna housing. The present invention further relates to the use of a polymer composition for the preparation of an article preferably an antenna housing with non-crack percentage of at least 70% at −33° C. in a falling weight impact test.

20 Claims, No Drawings

ANTENNA HOUSING WITH IMPROVED FALLING WEIGHT IMPACT RESISTANCE

CROSS REFERENCE TO RELATED APPLICATIONS

This application is a National Stage application of PCT/EP2020/051447, filed Jan. 21, 2020, which claims the benefit of Chinese Application No. 201910066643.9, filed Jan. 24, 2019, the disclosures of which are incorporated herein by reference in their entirety.

The present invention relates to an antenna housing with improved falling weight impact resistance. The present invention further relates to a process for the preparation of an antenna housing and the use of a polymer composition for the preparation of an article with improved falling weight impact resistance.

Antennas are widely used in telecom communication for example in base stations. Base stations are built with certain distance in-between to ensure the coverage of electromagnetic signal and antennas are mounted on the top of the station. For this type of antennas to be used in exterior and exposed to open air, antenna housing can be used to provide physical protection again environment. Plastic housings for telecom communication antennas are known. There are several severe requirements to which the polymer compositions have to comply in order to be suitable for use in antenna housing, such as a high temperature resistance, good ultraviolet absorption resistance, good ageing resistance, good crazing resistance, good corrosion resistance, and high mechanical and dimensional strength. These antenna housings may be located in a severe environment e.g. located in high altitude and exposed to extreme weather like hailstorm and therefore it should have excellent low temperature falling weight impact resistance.

Preferably a polymer composition with non-crack percentage at −33° C. of at least 70% in a falling weight impact test is used for the preparation of an antenna housing.

The falling weight impact test according to the present invention may be performed on a customized machine comprising a weight release mechanism and a plaque support,
- wherein the weight release mechanism is able to release a metallic ball with 500 gram weight and 50 mm diameter from 1.3 m height with 0 initial velocity as a free falling object to create falling weight impact on the test plaque and the plaque support comprises two square-shape metallic clamps with open space in the centre, the shape of the open space is also square,
- wherein the outside dimension of the clamps is 150*150 mm and inside dimension of the clamps is 130*130 mm and the horizontal geometric centre of the outer square superposes with that of the inner square,
- wherein when a plaque is installed on the plaque support, it is fixed horizontally by compression between the clamps and the horizontal geometric centre of the plaque superposes with that of the clamps, p1 wherein the weight release mechanism and the plaque support are positioned in a way that the falling weight impact is created perpendicularly on the plaque surface and the horizontal geometric centre of the plaque superposes with that of the impact point using samples in the form moulded plaques with dimension 150*150*2.5 mm
- wherein the plaque may be conditioned in a freezer at −33° C. for at least 4 hours before installation on the plaque support and the whole falling impact operation may be completed within 30 secs starting from taking the plaque out of the freezer,
- wherein after the falling impact the plaque can be checked visually whether a crack is present on its surface and 10 plaques can be tested for each sample and a non-crack percentage can be calculated.

CN108467532A discloses a light-weight antenna housing comprising a resin matrix, glass fiber, hollow glass microsphere, toughening modifying agent, weather resistant agent, lubricant and antioxidant. However, it did not disclose falling weight impact resistance.

It is an object of the present invention to provide an antenna housing with improved falling weight impact resistance.

In a preferred embodiment, it is an object of the present invention to provide an antenna housing with improved falling weight impact resistance at low temperature, e.g. −33° C.

The present invention further relates to a process for the preparation of an antenna housing with improved resistance to falling weight impact resistance and the use of a polymer composition for the preparation of an antenna housing.

The present invention further relates to the use of a polymer composition for the preparation of an article preferably an antenna housing with non-crack percentage of at least 70% at −33° C. in a falling weight impact test.

One or more of these objects are achieved by an antenna housing comprising a polymer composition, wherein the polymer composition comprises a thermoplastic polymer, glass fiber and an inorganic filler.

It was surprisingly found that this antenna housing according to the present invention has improved resistance against falling weight impact.

Thermoplastic

A thermoplastic is a polymer that becomes pliable or mouldable above a specific temperature and solidifies upon cooling. Suitable examples of thermoplastic polymers include but are not limited to polyamide, such as polyamide 6, polyamide, 66 or polyamide 46; polyolefins, for example polypropylenes and polyethylenes; polyesters, such as polyethylene terephthalate, polybutylene terephthalate; polycarbonates; polyphenylene sulphide; polyurethanes and mixtures thereof.

The thermoplastic polymer is preferably a polyolefin, more preferably a polyolefin chosen from the group of polypropylenes or elastomers of ethylene and α-olefin comonomer having 4 to 8 carbon atoms, and any mixtures thereof.

In an embodiment of the present invention, the thermoplastic polymer is polypropylene. the polypropylene may for example be a propylene homopolymer or a random propylene-α-olefin copolymer or a heterophasic propylene copolymer.

The α-olefin in the random propylene-α-olefin copolymer is for example an α-olefin chosen from the group of α-olefin having 2 or 4 to 10 carbon atoms, preferably ethylene, 1-butene, 1-hexene or any mixtures thereof. The amount of α-olefin is preferably at most 10 wt % based on the propylene-α-olefin copolymer, for example in the range from 2-7 wt % based on the propylene-α-olefin copolymer.

A heterophasic propylene copolymer consists of a propylene-based matrix and a dispersed ethylene-α-olefin copolymer. The matrix of a heterophasic propylene copolymer can be a propylene homopolymer or a random propylene-α-olefin copolymer, preferably the matrix of the heterophasic propylene copolymer is a propylene homopolymer; the α-olefin in the ethylene-α-olefin copolymer contains 3-10 carbon atoms, preferably propylene, 1-butene, 1-hexene or any mixtures thereof, more preferably the ethylene-α-olefin copolymer is a ethylene-propylene copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

In a preferred embodiment of the present invention, the polypropylene is a heterophasic propylene copolymer.

In an preferred embodiment of the present invention, the heterophasic propylene copolymer has a melt flow rate from 0.1 to 10.0 g/10min as determined in accordance with ISO 1133:1-2011 (230° C., 2.16 kg). In a specific embodiment the heterophasic propylene copolymer comprises between 70 and 90 wt % of said matrix and between 10 and 30 wt % of said dispersed phase.

In a preferred embodiment of the present invention, the amount of heterophasic propylene copolymer is at least 10 wt %, for example at least 20 wt %, for example at least 24 wt % and/or at most 80 wt %, for example at most 70 wt %, for example at most 60 wt %, for example at most 50 wt %, based on the total weight of the polymer composition.

Glass Fiber

In general, glass fiber is a glassy cylindrical substance where its length is significantly longer than the diameter of its cross section. It is known that adding glass fiber is able to improve the mechanical performance (e.g. strength and stiffness) of polymeric resin. The level of performance improvement depends heavily on the properties of the glass fiber, e.g. diameter, length.

Both long glass fiber (length from 0.5 to 50 mm) and short glass fiber (length shorter than 0.5 mm) can be used in the present invention.

In an embodiment of the present invention, the average diameter of the glass fiber ranges from 3 to 50 μm, preferably from 5 to 30 μm, more preferably from 7 to 25 μm, more preferably from 9 to 15 μm.

Inorganic Filler

Inorganic fillers are known to be used in polymer composition to achieve improvement on properties e.g. optical, electrical and especially mechanical properties.

In an embodiment of the present invention, the inorganic filler is present in an amount of 2 to 20 wt %, preferably 3 to 15 wt %, more preferably 4 to 12 wt %, most preferably 5 to 10 wt % of the total polymer composition.

In an embodiment of the present invention, the total amount of glass fiber and the inorganic filler is from 21 to 50 wt %, preferably from 25 to 45 wt %, more preferably from 28 to 40 wt %, most preferably from 30 to 35wt % based on the total polymer composition.

In an embodiment of the present invention, the ratio between the amount of glass fiber and the amount of inorganic filler is in from 1.0 to 16.0, preferably from 1.5 to 12.0, more preferably from 2.0 to 8.0, more preferably from 2.2 to 6.2.

Suitable examples of inorganic include but are not limits to talc, calcium carbonate, wollastonite, barium sulfate, kaolin, glass flakes, laminar silicates (bentonite, montmorillonite, smectite) and mica.

In a preferred embodiment of the present invention, the inorganic filler is for example talc, for example calcium carbonate, for example wollastonite, for example mica, or a mixture thereof.

In an embodiment of the present invention, the inorganic filler is talc. The average size of talc (D50) of talc is preferably in the range from 0.1 to 10 micron, preferably from 0.3 to 8 micron, more preferably from 0.5 to 5 micron, even more preferably from 0.8 to 2.5 micron according to sedimentation analysis, Stockes' law (ISO 13317-3:2001).

In an embodiment of the present invention, the polymer composition further comprises a stabilizing additive mixture, wherein said stabilizing additive mixture comprises:
i) a thioether compound according to Formula I:

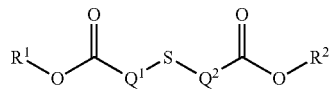

Formula I wherein $Q^1$ and $Q^2$ are each independently an alkyl spacer having between 1 and 6 carbon atoms, preferably being —$CH_2CH_2$—; $R^1$ and $R^2$ each independently being an alkyl group having between 14 and 26 carbon atoms, preferably between 16 and 20 carbon atoms, such as —$C_{18}H_{37}$; O being oxygen and S being sulphur;
ii) a Hindered Amine Light Stabilizer (HALS) comprising a substituted amine group; and
iii) an inorganic acid scavenger.

A "substituted amine group" as used in the present description means a group comprising a nitrogen atom that is substituted with other atoms than hydrogen. In other words, no —N(—H)— group. In an embodiment, the substituted amine group is an —N(—OR)— group or an —N(—R)— group wherein R is not a hydrogen.

In an embodiment, $Q^1$ and $Q^2$ are each —$CH_2CH_2$—; $R^1$ and $R^2$ each —$C_{18}H_{37}$. This is a dialkyl ester of thiodipropionic acid, with CAS no: 693-36-7, and it is commercially available for instance under the name Irganox PS 802 FL from BASF.

In an embodiment, the substituted amine group in the HALS is a —N(R)— group; wherein R is a hydrocarbyl group. In a specific embodiment, the HALS is according to Formula IIa or IIb

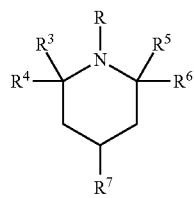

Formula IIa

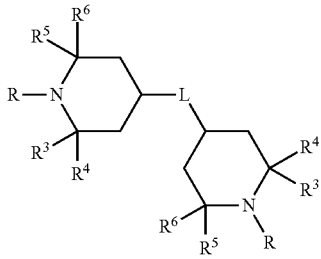

Formula IIb wherein:
$R^3$, $R^4$, $R^5$ and $R^6$ are each independently an alkyl ground having 1-3 carbon atoms;

$R^7$ is —O—C(=O)—$R^9$;

L is —O—C(=O)—$R^{10}$—C(=O)O—

R is either directly linked to the nitrogen atom (—$R^8$) or connected via an oxygen atom (—$OR^8$);

$R^8$ is an optionally substituted, optionally branched alkyl group having between 2 and 10 carbon atoms, such as between 3 and 5 carbon atoms;

$R^9$ is an alkyl group having between 4 and 14 carbon atoms;

$R^{10}$ is an alkyl group having between 4 and 14 carbon atoms.

In a further embodiment, in Formula IIa or IIb, $R^3$=$R^4$=$R^5$=$R^6$= methyl. In a further embodiment, in Formula IIa or IIb, $R^8$ is a branched alcohol group.

In a preferred embodiment, the HALS is a NOR-type hindered amine light stabilizer with the following structure:

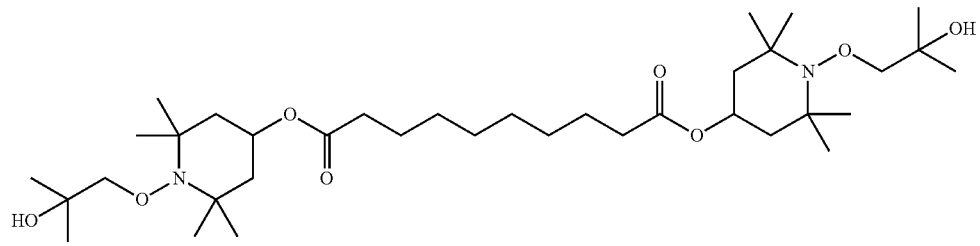 [SMILES: CC(C)(O)CON1C(C)(C)CC(OC(=O)CCCCCCCCC(=O)OC2CC(C)(C)N(OCC(C)(C)O)C(C)(C)C2)CC1(C)C]

NOR-type HALS is commercially available, for instance, Tinuvin® XT 855 FF from BASF.

In an embodiment, the inorganic acid scavenger is a hydrotalcite. In a preferred embodiment, this hydrotalcite is of the chemical family of aluminium-magnesium-carbonate-hydroxide (hydrate), with the following formula: $Mg_4 \cdot 3Al_2(OH)_{12} \cdot 6CO_3 \cdot mH_2O$. This compound has CAS no. 11097-59-9, and is commercially available for instance as Hycite 713 of Clariant.

In an embodiment of the present invention, the antenna housing comprises a polymer composition further comprising a polyolefin based elastomer.

In a preferred embodiment of the invention, the polyolefin based elastomer is an elastomer of ethylene and α-olefin comonomer having 4 to 8 carbon atoms.

The elastomer for example has a density in the range from 0.845 to 0.915 g/cm³. The elastomer may also sometimes be referred as a plastomer.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer.

In a preferred embodiment, the elastomer is an ethylene-1-octene copolymer.

In a preferred embodiment, the density of the elastomer is at least 0.845 g/cm³ and/or at most 0.915 g/cm³. For example, the density of the elastomer is at least 0.850 g/cm³, for example at least 0.855 g/cm³, and/or for example at most 0.905 g/cm³, for example at most 0.895 g/cm³, for example at most 0.880 g/cm³, for example at most 0.870 g/cm³, for example at most 0.860 g/cm³.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

In a preferred embodiment, the elastomer has a melt flow index of 0.1 to 40 dg/min (ISO1133, 2.16 kg, 190° C.), for example at least 0.2 dg/min and/or at most 35 dg/min. More preferably, the elastomer has a melt flow index of at least 0.5 dg/min, for example of at least 0.6 dg/min, for example of at least 0.8 dg/min, for example of at least 0.9 dg/min, and/or preferably at most 30 dg/min, more preferably at most 20 dg/min, more preferably at most 10 dg/min measured in accordance with ISO 1133 using a 2.16 kg weight and at a temperature of 190° C.

In a preferred embodiment, the amount of ethylene used to prepare the elastomer is at least 40 wt %. More preferably, the amount of ethylene used to prepare the elastomer is at least 45 wt %, for example at least 50 wt %, at least 54 wt %. The amount of ethylene used to prepare the elastomer may typically be at most 97.5 wt %, for example at most 83 wt %, for example at most 70 wt % or at most 60 wt %.

The polymer composition may further comprise additives, for example nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti-microbials, anti-fogging additives, slip additives, anti-blocking additives, polymer processing aids and the like. Such additives are well known in the art. The skilled person will know how to choose the type and amount of additives such that they do not detrimentally influence the aimed properties.

The amount of polymer composition is at least 70 wt %, for example at least 80 wt %, for example at least 90 wt %, for example at least 95 wt %, for example at least 98 wt % based on the weight of the antenna housing.

The present invention further relates to the process for the preparation of an antenna housing. The process for the preparation of an antenna housing comprises steps of providing a polymer composition, for example by extrusion or dry blending. The process for the preparation of an antenna housing further comprises steps of converting the polymer composition into an antenna housing, for example by injection molding or extrusion molding.

The present invention further relates to the use of said polymer composition for the preparation of an antenna housing.

The present invention further relates to the use of said polymer composition for the preparation of an article preferably an antenna housing with non-crack percentage of at least 70% at −33° C. in a falling weight impact test.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

EXAMPLES

The present invention is further elucidated based on the Examples below which are illustrative only and not considered limiting to the present invention.

Methods

The composition in prepared by compounding in a twin screw extruder as pellets, then testing sample preparation is done by single screw extrusion using the prepared pellets.

Tensile Test

Strain at break is obtained by tensile test according to ISO527-1:2012 at 23° C. by ZWICK Z005. Testing specimen were conditioned for 72 hr at 23±1° C. and at relative humidity of 50±5% before testing.

Falling Weight Impact Test

Samples were moulded into plaques with dimension: 150*150*2.5 mm.The falling weight impact test was performed on a customized machine. The customized machine comprises two parts: A weight release mechanism and a plaque support.The weight release mechanism is able to release a metallic ball with 500 gram weight and 50 mm diameter from 1.3 m height with 0 initial velocity as a free falling object to create falling weight impact on the test plaque.The plaque support comprises two square-shape metallic clamps with open space in the centre, the shape of the open space is also square. The outside dimensions of the clamps is 150*150 mm and inside dimension of the clamps is 130*130 mm. The horizontal geometric centre of the outer square superposes with that of the inner square. When a plaque is installed on the plaque support, it is fixed horizontally by compression between the clamps and the horizontal geometric centre of the plaque superposes with that of the clamps.

The weight release mechanism and the plaque support are positioned in a way that the falling weight impact is created perpendicularly on the plaque surface. The horizontal geometric centre of the plaque superposes with that of the impact point.

The plaque was conditioned in a freezer at −33° C. for at least 4 hours before installation on the plaque support. The whole falling impact operation is completed within 30 secs starting from taking the plaque out of the freezer.

After the falling impact, the plaque was checked visually whether a crack is present on its surface. 10 plaques were tested for each formulation and a non-crack percentage is calculated.

Materials

All examples comprise a polypropylene impact copolymer (PP-I1), being Yungsox 3003 of Formosa (CAS no. 9010-79-1), having a melt index of 0.35 g/10 min (determined according to ISO 1133:1-2011). This impact copolymer comprises 15.7 wt % of dispersed phase. The total amount of ethylene-based units (C2) in the copolymer (TC2) is 8.3 wt %. The amount of ethylene-based units (C2) in the dispersed phase (RCC2) is 52.9 wt %

All examples comprise a high stiffness impact copolymer (PP-I2), being Moplen EP5079 of LyondellBasell, with a melt flow rate (at 230° C., 2.16 kg) of 0.5 g/10 min. (determined according to ASTM D1238-13). This impact copolymer comprises 13.5 wt % of dispersed phase. The total amount of ethylene-based units (C2) in the copolymer (TC2) is 5.8 wt %. The amount of ethylene-based units (C2) in the dispersed phase (RCC2) is 43.0 wt %

All examples comprise an ethylene-1-octene copolymer as a toughening agent (TA), being Fortify C1055D of SABIC, with a melt flow rate of 1.0 g/10min (at 190° C., 2.16 kg) determined according to ASTM D1238-13, a density of 857 kg/m$^3$ (ASTM D792-10:2015).

All examples comprise short glass fiber (SGF) with CAS No. 65997-17-3 with sizing on surface to improve the compatibility of the short glass fiber and polypropylene. The short glass fiber has a diameter of 10 μm and a length of 4 mm. It is available from Owens Corning (OVC™ Reinforcements) under the name Performax 249A-10C.

All examples comprise a thiosynergistic heat stabilizer, being Irganox PS 802 FL by BASF (thioether). It is a dialkyl ester of thiodipropionic acid, with CAS no: 693-36-7.

All examples comprise a NOR-type (NOR HALS) hindered amine light stabilizer: Tinuvin® XT 855 FF from BASF.

All examples comprise an inorganic acid scavenger (Inorg.AS), being Hycite 713 of Clariant, with CAS number: 11097-59-9 of the chemical family of aluminium-magnesium-carbonate-hydroxide (hydrate), with a molar ratio of MgO to $Al_2O_3$ of between 4 and 5.

All examples further comprise an additive package comprising coupling agent, color masterbatch, processing aid, mould release agent, nucleating agent, phosphite antioxidant and polyphenolic antioxidant.

All inventive example comprises an ultra fin talc (UFT) HTP Ultra5L, supplied by Imerys Talc. D50 of this talc is 1.0 micron according to Sedimentation analysis, ISO 13317-3: 2001 (Stokes' law)

The composition of all examples and their properties are indicated in t Table 1

TABLE 1

| | | CE | IE1 | IE2 | IE3 |
|---|---|---|---|---|---|
| PP-I1 | wt % | 24.3 | 24.3 | 24.3 | 24.3 |
| PP-I2 | wt % | 24.3 | 24.3 | 24.3 | 24.3 |
| TA | wt % | 10 | 10 | 10 | 10 |
| SGF | wt % | 32 | 27 | 24.5 | 22 |
| UFT | wt % | 0 | 5 | 7.5 | 10 |
| Thioether | wt % | 0.4 | 0.4 | 0.4 | 0.4 |
| NOR HALS | wt % | 0.3 | 0.3 | 0.3 | 0.3 |
| Inorg. AS | wt % | 0.2 | 0.2 | 0.2 | 0.2 |
| AP | wt % | 8.5 | 8.5 | 8.5 | 8.5 |
| Strain at break | % | 5.98 | 6.42 | 6.58 | 7.18 |

TABLE 1-continued

|  |  | CE | IE1 | IE2 | IE3 |
|---|---|---|---|---|---|
| Non-crack percentage at −33° C. | % | 50 | 90 | 100 | 100 |

Glass fiber is present in all the examples, talc is present in IE1-3. According to Table 1 it is clear that with the presence of talc, strain at break and non-crack percentage of IE1-3 are significantly improved.

The invention claimed is:

1. An antenna housing comprising a polymer composition, wherein the polymer composition comprises a thermoplastic polymer, glass fiber and an inorganic filler,
   wherein the thermoplastic polymer is a heterophasic propylene copolymer consisting of a propylene-based matrix and a dispersed ethylene-α-olefin copolymer, the heterophasic copolymer comprises between 70 and 90 wt % of the matrix and between 10 and 30 wt % of the dispersed phase,
   wherein the inorganic filler is present in an amount of 2 to 20 wt % of the total polymer composition, and the total amount of glass fiber and the inorganic filler is from 21 to 50 wt % of the total polymer composition,
   wherein a ratio between the weight of glass fiber and the weight of the inorganic filler is from 1.0 to 16.0, and
   wherein the heterophasic propylene copolymer is present in an amount of 10 to 60 wt % of the total polymer composition.

2. The antenna housing according to claim 1, wherein the inorganic filler is present in an amount of 3 to 15 wt % of the total polymer composition.

3. The antenna housing according to claim 1, wherein the total amount of the glass fiber and the inorganic filler is from 25 to 45 wt %, based on the total amount of polymer composition.

4. The antenna housing according to claim 1, wherein the ratio between the weight of the glass fiber and the weight of the inorganic filler is from 1.5 to 12.

5. The antenna housing according to claim 1, wherein the inorganic filler is talc.

6. The antenna housing according to claim 5, wherein D50 of the talc is in the range from 0.8 to 2.5 μm according to sedimentation analysis, Stockes' law (ISO 13317-3:2001).

7. The antenna housing according to claim 1, wherein the polymer composition further comprises a polyolefin based elastomer.

8. The antenna housing according to claim 1, wherein the polymer composition further comprises a stabilizing additive mixture, wherein said stabilizing additive mixture comprises:
   i) a thioether compound according to Formula I:

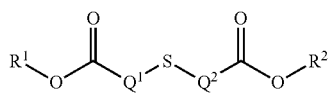

Formula I wherein $Q^1$ and $Q^2$ are each independently an alkyl spacer having between 1 and 6 carbon atoms; $R^1$ and $R^2$ each independently being an alkyl group having between 14 and 26 carbon atoms; O being oxygen and S being sulphur;
   ii) a Hindered Amine Light Stabilizer (HALS) comprising a substituted amine group; and
   iii) an inorganic acid scavenger.

9. The antenna housing according to claim 1, wherein the polymer composition further comprises an additive.

10. A process for the preparation of an antenna housing according to claim 1, comprising the steps of providing the polymer composition and converting the polymer composition into an antenna housing.

11. The antenna housing according to claim 1, wherein the antenna housing has a non-crack percentage of at least 70% at −33° C. in a falling weight impact test.

12. The antenna housing of claim 1, wherein the total amount of the glass fiber and the inorganic filler is from 28 to 40 wt %, based on the total amount of polymer composition.

13. The antenna housing of claim 1, wherein the total amount of the glass fiber and the inorganic filler is from 30 to 35 wt %, based on the total amount of polymer composition.

14. The antenna housing of claim 1, wherein the dispersed ethylene-α-olefin copolymer is an ethylene-propylene copolymer.

15. An antenna housing comprising a polymer composition, wherein the polymer composition comprises a thermoplastic polymer, glass fiber, an inorganic filler, a polyolefin based elastomer, and a stabilizing additive mixture,
   wherein the thermoplastic polymer is a heterophasic propylene copolymer consisting of a propylene-based matrix and a dispersed ethylene-α-olefin copolymer, the heterophasic copolymer comprises between 70 and 90 wt % of the matrix and between 10 and 30 wt % of the dispersed phase,
   wherein said stabilizing additive mixture comprises:
   i) a thioether compound according to Formula I:

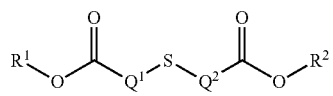

Formula I wherein $Q^1$ and $Q^2$ are each independently an alkyl spacer having between 1 and 6 carbon atoms; $R^1$ and $R^2$ each independently being an alkyl group having between 14 and 26 carbon atoms; O being oxygen and S being sulphur;
   ii) a Hindered Amine Light Stabilizer (HALS) comprising a substituted amine group; and
   iii) an inorganic acid scavenger
   wherein the inorganic filler is present in an amount of 2 to 20 wt % of the total polymer composition, and the total amount of glass fiber and the inorganic filler is from 21 to 50 wt % of the total polymer composition,
   wherein a ratio between the weight of glass fiber and the weight of the inorganic filler is from 1.0 to 16.0,
   wherein the antenna housing has a non-crack percentage of at least 70% at −33° C. in a falling weight impact test, and
   wherein the heterophasic propylene copolymer is present in an amount of 10 to 60 wt % of the total polymer composition.

16. The antenna housing according to claim 15, wherein the heterophasic propylene copolymer is present in an amount of 24 to 50 wt % of the total polymer composition.

17. The antenna housing according to claim 16, wherein the polyolefin based elastomer comprises an ethylene-1-octene copolymer.

18. The antenna housing according to claim 1, wherein the heterophasic propylene copolymer is present in an amount of 24 to 50 wt % of the total polymer composition.

19. The antenna housing according to claim 18, wherein the polymer composition further comprises a polyolefin based elastomer.

20. The antenna housing according to claim 19, wherein the polyolefin based elastomer comprises an ethylene-1-octene copolymer.

* * * * *